(12) United States Patent
Katsoulis et al.

(10) Patent No.: US 8,765,090 B2
(45) Date of Patent: Jul. 1, 2014

(54) METHOD FOR PREPARING A TRIHALOSILANE

(75) Inventors: Dimitris Katsoulis, Midland, MI (US); Robert Thomas Larsen, Midland, MI (US); Matthew J. McLaughlin, Midland, MI (US); Wendy Sparschu, Bay City, MI (US)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 13/809,263

(22) PCT Filed: Aug. 25, 2011

(86) PCT No.: PCT/US2011/049138
§ 371 (c)(1),
(2), (4) Date: Jan. 9, 2013

(87) PCT Pub. No.: WO2012/033644
PCT Pub. Date: Mar. 15, 2012

(65) Prior Publication Data
US 2013/0156676 A1  Jun. 20, 2013

Related U.S. Application Data

(60) Provisional application No. 61/380,744, filed on Sep. 8, 2010.

(51) Int. Cl.
*C01B 33/02* (2006.01)
*C01B 33/08* (2006.01)
*C07F 7/00* (2006.01)

(52) U.S. Cl.
USPC .................. 423/342; 423/349; 556/450

(58) Field of Classification Search
USPC ................................ 423/342, 349
See application file for complete search history.

(56) References Cited

U.S. PATENT DOCUMENTS

| | | | |
|---|---|---|---|
| 2,403,370 A | 7/1946 | Hurd | |
| 2,595,620 A | 5/1952 | Wagner et. al. | |
| 2,888,476 A | 5/1959 | Little et al. | |
| 3,057,686 A | 10/1962 | Muetterties | |
| 4,314,908 A | 2/1982 | Downing et al. | |
| 4,526,769 A * | 7/1985 | Ingle et al. | 423/342 |
| 4,836,997 A | 6/1989 | Lepage et al. | |
| 4,888,435 A | 12/1989 | Chadwick et al. | |
| 4,946,980 A | 8/1990 | Halm et al. | |
| 4,973,725 A | 11/1990 | Lewis et al. | |
| 5,716,590 A * | 2/1998 | Roewer et al. | 423/342 |
| 6,156,380 A | 12/2000 | Aramata et al. | |
| 6,790,749 B2 | 9/2004 | Takemura et al. | |
| 6,887,448 B2 | 5/2005 | Block et al. | |
| 7,223,879 B2 | 5/2007 | Buchwald et al. | |
| 7,442,824 B2 | 10/2008 | Paetzold et al. | |
| 7,559,969 B2 | 7/2009 | Sanjurjo et al. | |
| 7,716,590 B1 | 5/2010 | Nathan | |
| 8,124,809 B2 | 2/2012 | Masaoka et al. | |
| 2002/0044904 A1* | 4/2002 | Bulan et al. | 423/342 |
| 2004/0022713 A1* | 2/2004 | Bulan et al. | 423/342 |
| 2004/0028593 A1* | 2/2004 | Bulan et al. | 423/342 |
| 2004/0047797 A1* | 3/2004 | Block et al. | 423/349 |
| 2005/0074387 A1 | 4/2005 | Bulan et al. | |
| 2005/0220514 A1 | 10/2005 | Hisakuni | |
| 2009/0035205 A1* | 2/2009 | Bohmhammel et al. | 423/342 |
| 2010/0280295 A1 | 11/2010 | Armbruester et al. | |

FOREIGN PATENT DOCUMENTS

| | | |
|---|---|---|
| CA | 2829701 A1 | 9/2012 |
| DE | 3024319 | 1/1982 |
| DE | 4041644 A1 | 6/1992 |
| DE | 19654154 | 6/1997 |
| JP | 51-23226 | 2/1976 |
| JP | 2009111202 | 5/2009 |
| WO | 0248034 | 6/2002 |
| WO | 2005051963 | 6/2005 |
| WO | 2009037301 | 3/2009 |

OTHER PUBLICATIONS

Shimizu, etc Economics of Polysilicon Process Osaka Titanium Co DOE/JPL 1012122 (1985) p. 57-78.*
Dallas T. Hurd, The Vapor Phase Alkylation and Hydrogenation of Chlorosilanes, J. Am. Chem. Soc., 1945, 67 (9), pp. 1545-1548.
Eaborn, C. et al., Further studies on reactions of organic halides with disilanes catalysed by transition metal complexes, Journal of Organometallic Chemistry, vol. 225, 1982, pp. 331-341.
Golubtsov, S.A. et al., Role of the Products of Partial Chlorination of Silicon in the Formation of Methyltrichlorosilane, Russian Chemical Bulletin, vol. 21, No. 3 (1972), pp. 584-586.
H. Walter, Mechanism of the silicide-catalysed hydrodehalogenation of silicon tetrachloride to trichlorosilane, J. Chem. Soc., Faraday Trans., 1996,92, 4605-4608.
Juszczyk et al., of Pd/SiO2 catalysts during high temperature reduction., Department of Catalysis on Metals, Institute of Physical Chemistry, Polish Academy of Sciences, Warsaw, Pol. Catalysis Letters (2002), 78(1-4), 95-98.
Juszczyk et al., Transformation of Pd/SiO2 into palladium silicide during reduction at 450° and 500° C., Institute of Physical Chemistry, Department of Catalysis on Metals, Polish Academy of Sciences, Warsaw, Pol. Journal of Catalysis (2003), 220(2), 299-308.
Lobusevich, N.P. et al., Reactions During Direct Synthesis of Alkylchlorosilanes., vol. 48, No. 11, 1978, pp. 2534-2541.
Moreno-Manas, Marcial et al., Formation of Carbon-Carbon Bonds under Catalysis by Transition-Metal Nanoparticles, Department of Chemistry, Universitat Autonoma de Barcelona, Barcelona, Spain. Accounts of Chemical Research (2003), 36(8), 638-643.

(Continued)

*Primary Examiner* — Jie Yang
*Assistant Examiner* — Jenny Wu
(74) *Attorney, Agent, or Firm* — Catherine U. Brown; Matthew T. Fewkes

(57) ABSTRACT

A method of preparing a trihalosilane comprising the separate and consecutive steps of (i) contacting a copper catalyst with hydrogen gas and a silicon tetrahalide at a temperature of from 500 to 1400° C. to form a silicon-containing copper catalyst comprising at least 0.1% (w/w) of silicon, wherein the copper catalyst comprises a metal selected from copper and a mixture comprising copper and at least one element selected from gold, magnesium, and platinum; and (ii) contacting the silicon-containing copper catalyst with a hydrogen halide at a temperature of from 100 to 600° C. to form a trihalosilane.

18 Claims, No Drawings

(56) References Cited

OTHER PUBLICATIONS

Beccalli, Egle M., et al., C-C, C-O, C-N Bond Formation on sp2 Carbon by Palladium(II)-Catalyzed Reactions Involving Oxidant Agents., Istituto di Chimica Organica A. Marchesini, Facolta di Farmacia, Universita di Milano, Milan, Italy. Chemical Reviews (Washington, DC, United States) (2007), 107(11), 5318-5365.

Methivier, et al., Pd/SiC catalysts. Characterization and catalytic activity for the methane total oxidation.. Institut de Recherches sur la Catalyse-CNRS, conventionne a l'Universite Claude Bernard Lyon 1, Villeurbanne, Fr. Journal of Catalysis (1998), 173(2), 374-382.

Srebowata, A. et al., Hydrodechlorination of 1,2-dichloroethane over differently reduced Pd/SiO2 catalysts., Institute of Physical Chemistry, Polish Academy of Sciences, Warsaw, Pol. Polish Journal of Chemistry (2003), 77(12), 1841-1848.

Tanaka, Miyoko et al., Nanomaterials Laboratory, National Institute for Materials Science, Tsukuba, Sakura, Japan. Journal of Crystal Growth (2002), 237-239(Pt. 1), 254-258.

Terao, Jun et al., Transition metal-catalyzed C-C bond formation reactions using alkyl halides., Department of Applied Chemistry and Center for Atomic and Molecular Technologies, Graduate School of Engineering, Osaka University, 2-1 Yamadaoka, Suita, Osaka, Japan. Bulletin of the Chemical Society of Japan (2006), 79(5), 663-672.

Vijh, A. K. et al., Discovery of some new stable electrocatalytic materials for the anodic oxidation of hydrazine., Inst. Rech. Hydro-Quebec, Varennes, QC, Can. Journal of Materials Science Letters (1993), 12(2), 113-15.

Vijh, A. K. et al., Electrochemical activity of silicides of some transition metals for the hydrogen evolution reaction in acidic solutions., International Journal of Hydrogen Energy (1990), 15(11), 789-94.

Yin, Lunxiang, et al., Carbon-carbon coupling reactions catalyzed by heterogeneous palladium catalysts., Institute fuer Chemie, Humboldt-Universitaet Berlin, Berlin, Germany. Chemical Reviews (Washington, DC, United States) (2007), 107(1), 133-173.

Mulla, et. al., "Reaction of Magnesium Silicide & Silicon Tetrachloride/Trichlorosilane in Presence of Hydrogen", Indian Journal of Chemistry, Sep. 1988, pp. 756-758, vol. 27A.

* cited by examiner

METHOD FOR PREPARING A TRIHALOSILANE

CROSS REFERENCE TO RELATED APPLICATIONS

This application is a U.S. national stage filing under 35 U.S.C. §371 of PCT Application No. PCT/US 11/49138 filed on 25 Aug. 2011, currently pending, which claims the benefit of U.S. Provisional Patent Application No. 61/380,744 filed 8 Sep. 2010 under 35 U.S.C. §119 (e). PCT Application No. PCT/US11/49138 and U.S. Provisional Patent Application No. 61/380,744 are hereby incorporated by reference.

FIELD OF THE INVENTION

The present invention relates to a method of preparing a trihalosilane comprising the separate and consecutive steps of (i) contacting a copper catalyst with hydrogen gas and a silicon tetrahalide to form a silicon-containing copper catalyst, and (ii) contacting the silicon-containing copper catalyst with a hydrogen halide to form a trihalosilane.

BACKGROUND OF THE INVENTION

A number of methods of producing trihalosilane have been disclosed. For example, the reaction of HCl with zero-valent silicon has been described. In addition, trichlorosilane has been produced by passing silicon tetrachloride, hydrogen, and hydrogen chloride over zero-valent silicon at 600° C. Further, trichlorosilane has been produced by passing $H_2$ and $SiCl_4$ over silicon particles in a first stage, adding HCl to the effluent from the first stage, and then passing the effluent and HCl over more silicon particles optionally containing a catalyst (i.e., CuCl) in a second stage. Finally, trichlorosilane has been produced by passing $H_2$, $SiCl_4$, and HCl over zero-valent silicon containing homogeneously distributed copper silicide.

While the art describes methods of producing trichlorosilane, these methods have some limitations. Many of these processes employ zero-valent silicon. Since zero-valent silicon is typically produced by the highly energy-intensive carbothermic reduction of silicon dioxide, using zero-valent silicon adds costs to these processes.

Therefore, there is a need for more economical methods of producing trihalosilanes that avoid the need for using zero-valent silicon.

BRIEF SUMMARY OF THE INVENTION

The present invention is directed to a method of preparing a trihalosilane comprising the separate and consecutive steps of (i) contacting a copper catalyst with hydrogen gas and a silicon tetrahalide at a temperature of from 500 to 1400° C. to form a silicon-containing copper catalyst comprising at least 0.1% (w/w) of silicon, wherein the copper catalyst comprises a metal selected from copper and a mixture comprising copper and at least one element selected from gold, magnesium, and platinum; and (ii) contacting the silicon-containing copper catalyst with a hydrogen halide at a temperature of from 100 to 600° C. to form a trihalosilane.

The method of the present invention produces a trihalosilane using silicon tetrahalide. Silicon tetrahalide is a byproduct of industrial processes and may be produced using less energy than required to produce zero-valent silicon. Thus, the method of the invention may be more economical than prior processes for producing trihalosilane.

The trihalosilane produced by the method of the invention can be used to make high purity polysilicon, which is used in solar cells or electronic chips, or can be hydrolyzed in known processes to produce polysiloxanes, which find use in many industries and applications.

DETAILED DESCRIPTION OF THE INVENTION

A method of preparing a trihalosilane, the method comprising the following separate and consecutive steps:

(i) contacting a copper catalyst with hydrogen gas and a silicon tetrahalide at a temperature of from 500 to 1400° C. to form a silicon-containing copper catalyst comprising at least 0.1% (w/w) of silicon, wherein the copper catalyst comprises a metal selected from copper and a mixture comprising copper and at least one element selected from gold, magnesium, and platinum; and (ii) contacting the silicon-containing copper catalyst with a hydrogen halide at a temperature of from 100 to 600° C. to form a trihalosilane.

In step (i), a copper catalyst is contacted with hydrogen gas and a silicon tetrahalide at a temperature of from 500 to 1400° C. to form a silicon-containing copper catalyst comprising at least 0.1% (w/w) of silicon, wherein the copper catalyst comprises a metal selected from copper and a mixture comprising copper and at least one element selected from gold, magnesium, and platinum.

The copper catalyst comprises a metal selected from copper and a mixture comprising copper and at least one element selected from gold, magnesium, and platinum. The mixture typically comprises from 0.1 to less than 100% (w/w), alternatively from 50 to less than 100% (w/w), alternatively, from 70 to less than 100% (w/w), alternatively, from 80 to 99.9% (w/w), of copper, based on the total weight of the mixture, with the balance of the mixture being at least one of the elements described above.

The copper catalyst may further comprise a support. Examples of supports include, but are not limited to, oxides of aluminum, titanium, zirconium, and silicon; activated carbon; carbon nanotubes; fullerenes; graphene and other allotropic forms of carbon. In one embodiment, the support is activated carbon.

When the copper catalyst comprises a support, the catalyst typically comprises from 0.1 to less than 100% (w/w), alternatively from 0.1 to 50% (w/w), alternatively from 0.1 to 35% (w/w), of copper or the mixture, based on the combined weight of the support and copper or the mixture.

The copper catalyst can have a variety of physical forms including, but not limited to, lumps, granules, flakes, and powder.

As used herein, the term "metal" refers to zero-valent metal, a metal compound, or a combination of zero-valent metal and a metal compound. The oxidation number of the metal can vary, for example, from 0 to an oxidation number equal to the metal's group number in the Periodic Table of Elements, alternatively the oxidation number is from 0 to 2, alternatively the oxidation number is 0 for copper, gold and platinum, and 2 for magnesium.

Examples of the unsupported copper catalyst include, but are not limited to, zero-valent copper, mixtures of zero-valent copper and metallic gold, mixtures of zero-valent copper, zero-valent gold and magnesium chloride, and mixtures of zero-valent copper and zero-valent platinum.

Examples of the supported copper catalyst include the unsupported copper catalysts described above on an activated carbon support.

The unsupported and supported copper catalysts can be made by processes known in the art. For example, to make the unsupported catalyst, metallic copper, metallic gold, magnesium chloride, and metallic platinum may be mixed to form the copper catalysts. Alternatively, metal salts, including, but not limited to, halide, acetate, nitrate, and carboxylate salts of copper, gold, magnesium, and platinum, may be mixed in desired proportions and then reduced with hydrogen at elevated temperature, typically around 500° C. One such reduction process is described below for making the supported copper catalysts. This process may leave some salts, such as magnesium chloride, unreduced, while reducing others.

The supported copper catalyst may be prepared by, for example, dissolving a copper salt, such as cupric chloride, in a solvent, such as water or acid, applying this copper salt solution to a support, and reducing the copper salt on the surface of the support. For example, $CuCl_2$ can be dissolved in water or hydrochloric acid and mixed with activated carbon. Excess $CuCl_2$ solution can then be removed, and the activated carbon-$CuCl_2$ mixture dried. The $CuCl_2$ can then be reduced on the activated carbon with hydrogen at high temperature, typically about 500° C., to give the supported copper catalyst. One skilled in the art would understand that the order of addition and reduction and multistep addition of salts and subsequent reduction can also be carried out to prepare the supported catalyst. In addition, it is contemplated that the supported copper catalyst may be prepared by separately reducing separate metals on separate supports and then mixing the separately supported metals to form the copper catalyst. A method of making the supported metallic catalysts is also described in detail in the examples section below. Some of these catalysts are also available commercially.

The silicon tetrahalide has the formula $SiX_4$, where X is chloro, bromo, fluoro, or iodo, alternatively chloro, bromo, or iodo, alternatively chloro.

Examples of the silicon tetrahalide include, but are not limited, silicon tetrachloride, silicon tetrabromide, silicon tetraiodide, and silicon tetrafluoride. In one embodiment, the silicon tetrahalide is silicon tetrachloride.

The reactor for step (i) can be any reactor suitable for the combining of gases and solids. For example, the reactor configuration can be a packed bed, stirred bed, vibrating bed, moving bed, re-circulating bed, or a fluidized bed. When using a re-circulating bed, the silicon-containing copper catalyst can be circulated from a bed for conducting step (i) to a separate bed for conducting step (ii). To facilitate reaction, the reactor should have means to control the temperature of the reaction zone.

The temperature at which the hydrogen and the silicon tetrahalide are contacted with the copper catalyst is typically from 500 to 1400° C.; alternatively from 600 to 1200° C.; alternatively from 650 to 1100° C.

The pressure at which the hydrogen and the silicon tetrahalide are contacted with the copper catalyst can be sub-atmospheric, atmospheric, or super-atmospheric. For example, the pressure is typically from atmospheric pressure to 4000 kilopascals gauge (kPag); alternatively from 0 to 2000 kPag; alternatively from 7 to 1000 kPag.

The mole ratio of hydrogen to silicon tetrahalide contacted with the copper catalyst is typically from 10,000:1 to 0.01:1, alternatively from 100:1 to 1:1, alternatively from 20:1 to 2:1, alternatively from 20:1 to 5:1.

The residence time for the hydrogen and silicon tetrahalide is sufficient for the hydrogen and silicon tetrahalide to contact the copper catalyst and form the silicon-containing copper catalyst. For example, a sufficient residence time for the hydrogen and silicon tetrahalide is typically at least 0.01 seconds (s); alternatively at least 0.1 s; alternatively from 0.1 s to 10 min; alternatively from 0.1 s to 1 min; alternatively from 1 s to 10 s. As used herein, "residence time" means the time for one reactor volume of reactant gases (i.e., hydrogen and silicon tetrahalide) to pass through a reactor charged with copper catalyst. The desired residence time may be achieved by adjusting the flow rate of the hydrogen and silicon tetrahalide.

The hydrogen and silicon tetrahalide are typically fed to the reactor simultaneously; however, other methods of combining, such as by separate pulses, are also envisioned.

The copper catalyst is in a sufficient amount. As used herein, a "sufficient amount" of copper catalyst is enough catalyst to form the silicon-containing copper catalyst, described below, when the hydrogen and silicon tetrahalide are contacted with the copper catalysts. For example, a sufficient amount of catalyst is at least 0.01 mg catalyst/$cm^3$ of reactor volume; alternatively at least 0.5 mg catalyst/$cm^3$ of reactor volume; alternatively from 1 to 10,000 mg catalyst/$cm^3$ of reactor volume.

There is no upper limit on the time for which step (i) is conducted. For example, step (i) is usually conducted for at least 0.1 seconds, alternatively from 1 second to 5 hours, alternatively from 1 minute to 1 hour.

Step (i) produces a silicon-containing copper catalyst comprising, based on the total weight of the silicon-containing copper catalyst including any support, at least 0.1% (w/w), alternatively from 0.1 to 90% (w/w), alternatively 1 to 20% (w/w), alternatively from 1 to 5% (w/w), of silicon. The percentage of silicon in the silicon-containing copper catalyst can be determined using standard analytical tests. For example, the percentage of silicon may be determined using inductively coupled plasma atomic emission spectroscopy (ICP-AES) and ICP mass spectrometry (ICP-MS)

In step (ii) of the method, the silicon-containing copper catalyst, as described above for step (i), is contacted with a hydrogen halide at a temperature of from 100 to 600° C. to form a trihalosilane.

The hydrogen halide has the formula HX, where X is as defined above for the silicon tetrahalide and may be the same or different as for the silicon tetrahalide.

Examples of the hydrogen halide include, but are not limited to, hydrogen chloride, hydrogen bromide, and hydrogen iodide.

The reactors suitable for use in (ii) are as described for (i). The same reactor may be used for step (i) as used in step (ii); however, separate reactors may also be used.

The hydrogen halide is typically contacted with the silicon-containing copper catalyst by feeding the hydrogen halide into a reactor containing the silicon-containing copper catalyst produced in step (i).

The residence time of the hydrogen halide is sufficient for the hydrogen halide to react with the silicon-containing copper catalyst to form a trihalosilane. For example, a sufficient residence time of the hydrogen halide is typically at least 0.01 s, alternatively at least 0.1 s, alternatively from 0.5 s to 10 min, alternatively from 1 to 60 s, alternatively from 1 to 10 s. The desired residence time can be achieved by adjusting the flow rate of the hydrogen halide.

The temperature at which hydrogen halide is contacted with the silicon-containing copper catalyst is typically from 100 to 600° C.; alternatively from 200 to 500° C.; alternatively from 250 to 375° C.

Step (ii) is typically conducted until the silicon in the silicon-containing copper catalyst falls below a predetermined limit. For example, step (ii) is typically conducted until the silicon in the silicon-containing copper catalyst is below 90% (w/w), alternatively from 1 to 90% (w/w), alternatively from 1 to 40% (w/w), of its initial weight. As used herein, the "initial weight" of silicon in the silicon-containing copper catalyst means the weight of silicon in the silicon-containing copper catalyst before being contacted with the hydrogen halide in step (ii). The amount of silicon in the silicon-containing catalyst contacted with the hydrogen halide in step (ii) may be determined as described for the silicon-containing catalyst for step (i).

The pressure at which the hydrogen halide is contacted with the silicon-containing copper catalyst in (ii) can be sub-atmospheric, atmospheric, or super-atmospheric. For example, the pressure is typically from atmospheric pressure to 4000 kPag; alternatively from 0 to 2000 kPag; alternatively from 7 to 1000 kPag.

The silicon-containing copper catalyst is in a sufficient amount. As used herein, a "sufficient amount" of silicon-containing copper catalyst is enough catalyst to form the trihalosilane, described below, when contacted with the hydrogen halide. For example, a sufficient amount of silicon-containing copper catalyst is at least 0.01 mg silicon-containing copper catalyst/cm$^3$ of reactor volume; alternatively at least 0.5 mg silicon-containing copper catalyst/cm$^3$ of reactor volume; alternatively from 1 to 10,000 mg silicon-containing copper catalyst/cm$^3$ of reactor volume.

In one embodiment, step (ii) is conducted in the presence of hydrogen. When present, the hydrogen and hydrogen halide are in a mole ratio of hydrogen to hydrogen halide of at least 0.05:1, alternatively from 0.05:1 to 50:1, alternatively from 0.25:1 to 20:1, alternatively from 2:1 to 10:1.

The residence time, pressure, temperature and other parameters for the hydrogen and hydrogen halide together are as described for the hydrogen halide above.

Step (i) and step (ii) of the method are conducted separately and consecutively. As used herein, "separately" means that the step (i) and step (ii) do not overlap or coincide. As used herein, "consecutively" means that step (ii) is performed after step (i) in the method; however, additional steps may be performed between step (i) and (ii), such as described below.

The method of the invention may also comprise purging prior to the contacting of the silicon-containing copper catalyst with the hydrogen halide in step (ii) and prior to the contacting of the reformed silicon-containing catalyst with the hydrogen halide in (iv), described below. As used herein, "purging" means to introduce a gas stream to the reactor containing the silicon-containing copper catalyst to remove unwanted materials. Unwanted materials are, for example, $O_2$ and $H_2O$. Purging may be accomplished with an inert gas, such as argon, nitrogen, or helium or with a reactive gas, such as silicon tetrachloride, which reacts with moisture thereby removing it.

In one embodiment, the method further comprises step (iii) contacting the silicon-containing copper catalyst contacted with the hydrogen halide in step (ii) with the mixture comprising hydrogen gas and a silicon tetrahalide at a temperature of from 500 to 1400° C. to reform the silicon-containing copper catalyst comprising at least 0.1% (w/w) silicon; and step (iv) contacting the reformed silicon-containing copper catalyst with the hydrogen halide at a temperature of from 100 to 600° C. to form the trihalosilane.

In another embodiment, the method of the invention further comprises repeating steps (iii) and (iv) at least 1 time, alternatively from 1 to 10$^5$ times, alternatively from 1 to 1000 times, alternatively from 1 to 100 times, alternatively from 1 to 10 times.

The method may further comprise pre-heating and gasifying the silicon tetrahalide by known methods prior to contacting with the copper catalyst in steps (i) and (iii). Alternatively, the process may further comprise bubbling the hydrogen through the silicon tetrahalide to vaporize the silicon tetrahalide prior to contacting with the copper catalysts in step (i) and the silicon-containing copper catalyst in step (iii).

The process may further comprise recovering the trihalosilane produced. The trihalosilane may be recovered by, for example, removing gaseous trihalosilane and any other gases from the reactor followed by isolation of the trihalosilane by distillation.

The trihalosilane produced by the process described and exemplified above has the formula $HSiX_3$, wherein X is as defined and exemplified for the silicon tetrahalide.

Examples of trihalosilanes prepared according to the present process include, but are not limited to, $HSiCl_3$, $HSiBr_3$, and $HSiI_3$.

The method of the present invention produces a trihalosilane from silicon tetrahalide. Since silicon tetrahalide, such as silicon tetrachloride, is a byproduct of other industrial processes and may be produced using less energy than required to produce zero-valent silicon, the method of the invention may be more economical than methods of producing trihalosilane using zero-valent silicon.

The process of the present invention produces a trihalosilane that can be used to make high purity polysilicon or that can be hydrolyzed in known processes for producing polysiloxanes. High purity polysilicon finds use in, for example, solar cells and computer chips, and polysiloxanes find use in many industries and applications.

EXAMPLES

The following examples are presented to better illustrate the method of the present invention, but are not to be considered as limiting the invention, which is delineated in the appended claims. Unless otherwise noted, all parts and percentages reported in the examples are by weight. The following table describes the abbreviations and terms used in the examples:

TABLE 1

List of abbreviations and terms used in the examples.

| Abbreviation | Word |
|---|---|
| g | gram |
| mg | milligram |
| Me | methyl |
| wt | weight |
| % | percent |
| mol | mole |
| hr | hour |
| ° C. | degrees Celsius |
| NA | not applicable |
| mL | milliliters |
| cm | centimeter |
| sccm | standard cubic centimeters per minute |
| TCD | thermal conductivity detector |
| Sel. | selectivity |
| Selectivity | mole % of product, based on weight of product and all other silicon-containing products |
| GC | gas chromatography |
| ND | none detected |

TABLE 1-continued

List of abbreviations and terms used in the examples.

| Abbreviation | Word |
|---|---|
| Temp. | temperature |
| P | pressure |
| kPag | kilopascals (gauge) |
| min | minutes |
| s | seconds |

Method of Producing Copper Catalyst Comprising Copper, Gold, and Magnesium $CuCl_2.2H_2O$ (99+%, 1.0526 g), 0.0192 g $AuCl_3$ (99%), and 0.0357 g $MgCl_2.6H_2O$ (99.995%) were dissolved in 2.1 mL of deionized $H_2O$ and 0.1 mL concentrated HCl to form a metal salt mixture. This metal salt mixture was then added to 1.1734 g of activated carbon. Excess liquid not absorbed by the activated carbon was dabbed away, and then the activated carbon was dried at 175° C. The dried activated carbon had a final dry weight of 1.9355 g. Based on the starting weight of the activated carbon and metal solution loading, the metal loading on the activated carbon was calculated to be 22.3% (w/w) Cu, 0.71% (w/w) Au, and 0.24% (w/w) Mg. The metal loaded activated carbon (0.77 g) was charged into a quartz glass tube and placed into a flow reactor. Activation and reduction of the catalyst was performed by flowing $H_2$ at 100 sccm (controlled via MKS 1179A mass flow controller) into the glass tube containing the catalyst in the reactor at 600° C. for 5 hours. The heating was accomplished using a Lindberg/Blue Minimite 1 inch tube furnace.

Reaction Apparatus

The reaction apparatus comprised a 4.8 mm inner diameter quartz glass tube in a flow reactor. The reactor tube was heated using a Lindberg/Blue Minimite 2.54 cm tube furnace. MKS 1179A mass flow controllers were used to control gas flow rates. A stainless steel $SiCl_4$ bubbler was used to introduce $SiCl_4$ into the $H_2$ gas stream. The amount of $SiCl_4$ in the $H_2$ gas stream was adjusted by changing the temperature of the $SiCl_4$ in the bubbler according to calculations using well-known thermodynamic principles. For reactions run at pressures above atmospheric pressure, a back pressure regulator (GO type Hastelloy® rated for 0-500 psig) was introduced at the back end of the reactor. The reactor effluent passed through an actuated 6-way valve from Vici.

Reagents

The activated carbon, $CuCl_2.2H_2O$, $AuCl_3$, and $MgCl_2.6H_2O$ and other reagents used in the examples were purchased from Sigma Aldrich (Milwaukee, Wis.).

Product Analysis

The effluent of the reactor containing the products and byproducts was passed through an actuated 6-way valve (Vici) with constant 100 uL injection loop before being discarded. Samples were taken from the reaction stream by actuating the injection valve and the 100 μL sample passed directly into the injection port of a 6890A Agilent GC for analysis with a split ratio at the injection port of 5:1. The GC contained a single 30 m Rtx-DCA column (Restek, 320 um inner diameter, 1 μm thick film), which was split at the outlet. One path went to a TCD for quantization of the reaction products and the other path went to a Flame Ionization Detector.

Flow Rates

Flow rate ratios were determined using known thermodynamic principles and the flow rates of hydrogen and $SiCl_4$ at standard temperature and pressure.

Example 1

A copper catalyst (0.6085 g) comprising an activated carbon supported mixture of 22.3% (w/w) Cu, 0.71% (w/w) Au, and 0.24% (w/w) Mg was prepared as described above. The copper catalyst was then treated with $H_2$ and $SiCl_4$ at a mole ratio of $H_2$ to $SiCl_4$ of 16:1 for 30 min by bubbling $H_2$ (100 sccm) through a stainless steel bubbler containing liquid $SiCl_4$ at about 0° C. and into a flow reactor containing the copper catalyst at 750° C. to form a silicon-containing copper catalyst comprising about 4% (w/w) Si. After 30 minutes, the $SiCl_4$ flow was ceased, and the hydrogen flow was maintained for about 1 hr. while cooling the reactor to 300° C.

The reactor containing the silicon-containing copper catalyst was then purged with a 50 sccm argon flow for 15 min. After the purging, HCl was fed through the reactor at a flow rate of 5 sccm. The reaction effluent was periodically analyzed by GC to determine the $HSiCl_3$ selectivity. After the silane production rate declined, the HCl feed was ceased, and the silicon-containing copper catalyst was contacted again with $H_2$ and $SiCl_4$ for 30 min at 750° C. to reform the silicon-containing copper catalyst. The reformed silicon-containing copper catalyst was then purged with argon and contacted again with HCl as described above.

This cycle of treating the copper catalyst with $H_2$ and $SiCl_4$ to form the silicon-containing copper catalyst (step (i)) and exposing the silicon-containing catalyst formed to HCl (step (ii)) was repeated six times. In some cycles, hydrogen or argon were co-fed with the HCl to the catalyst. Each cycle's conditions and the selectivity results are shown in Table 2. This example shows that $HSiCl_3$ can be produced with good selectivity, the benefits of adding hydrogen with the hydrogen halide, and that the silicon-containing copper catalyst can be regenerated repeatedly.

TABLE 2

Production of $HSiCl_3$ at various temperatures and pressures with catalyst comprising Cu, Au, and Mg on activated carbon.

| Cycle # | Flow Rates and Conditions | | Time (min.) | Selectivity (mol % Si products) | | |
|---|---|---|---|---|---|---|
| | Step 1 | Step 2 | Step 2 | $HSiCl_3$ | $H_2SiCl_2$ | $SiCl_4$ |
| 1 | $H_2$: 100 sccm | HCl: 5 sccm | 9 | 22.4 | ND | 77.6 |
| | | T: 300° C. | 30 | 0.4 | ND | 99.6 |
| | SiCl4: 7.2 sccm | P: 9.65 kPag | 51 | ND | ND | 100.0 |
| | | | 73 | ND | ND | 100.0 |
| | P: 49.6 kPag | | 99 | ND | ND | 100.0 |
| 2 | $H_2$ Flow: 100 sccm | HCl: 5 sccm | 9 | 28.6 | ND | 71.2* |
| | | Ar: 5 sccm | 33 | 4.4 | ND | 95.6 |
| | SiCl4: 10.7 sccm | T: 300° C. | 56 | ND | ND | 100.0 |
| | | P: 7.6 kPag | 83 | ND | ND | 100.0 |
| | P: 22.1 kPag | | 104 | ND | ND | 100.0 |
| | | | 125 | ND | ND | 100.0 |
| | | | 151 | ND | ND | 100.0 |
| | | | 172 | ND | ND | 43.9* |
| | | | 195 | ND | ND | 100.0 |
| | | | 245 | ND | ND | 100.0 |
| 3 | $H_2$: 100 sccm | HCl: 5 sccm | 8 | 58.5 | 0.1 | 41.4 |
| | | $H_2$: 5 sccm | 31 | 4.6 | ND | 95.4 |
| | SiCl4: 3.5 sccm | Temp.: 300° C. | 52 | ND | ND | 69.7* |
| | | | 73 | ND | ND | 58.6* |
| | P: 213 kPag | P: 7.6 kPag | 94 | ND | ND | 54.4* |

TABLE 2-continued

Production of HSiCl₃ at various temperatures and pressures with catalyst comprising Cu, Au, and Mg on activated carbon.

| Cycle # | Flow Rates and Conditions Step 1 | Flow Rates and Conditions Step 2 | Time (min.) Step 2 | Selectivity (mol % Si products) HSiCl₃ | Selectivity (mol % Si products) H₂SiCl₂ | Selectivity (mol % Si products) SiCl₄ |
|---|---|---|---|---|---|---|
| 4 | H₂: 100 sccm SiCl4: 6.8 sccm P: 75.2 kPag | HCl: 5 sccm H₂: 5 sccm Temp.: 400 °C. P: 11.0 kPag | 8 30 55 76 118 | 58.5 ND ND ND ND | 1.3 ND ND ND ND | 40.2* 100.0 100.0 100.0 100.0 |
| 5 | H₂: 100 sccm SiCl4: 4.3 sccm P: 153 kPag | HCl: 5 sccm H₂: 5 sccm Temp: 200 °C. P: 13-48 kPag | 5 31 56 85 120 | 45.1 50.7 73.8 76.2 60.4 | ND ND ND ND ND | 54.9 49.3 26.2 23.8 39.6 |
| 6 | H₂: 100 sccm SiCl4: 3.6 sccm P: 213 kPag | HCl: 5 sccm H₂: 5 sccm Temp.: 300 °C. P: 744-848 kPag | 8 30 68 | 47.4 9.4 ND | 0.8 ND ND | 51.8* 90.6 100.0 |

*balance of material is methylated silicon-containing products.

Example 2

A catalyst comprising 16.5% Cu, 0.7% Au, and 0.2% Mg on activated carbon was prepared and treated as described in example 1, except the stainless steel bubbler was at 23° C. to give a mole ratio of H₂ to SiCl₄ of 10:1 and the time was varied as indicated in Table 3, to form a silicon-containing copper catalyst comprising about 4% (w/w) Si. The silicon-containing copper catalyst was reacted in step 2 as in example 1 but with the parameters listed in Table 3 and at 300° C. in every cycle. This example shows that HSiCl₃ can be produced with good selectivity, the benefits of adding hydrogen with the hydrogen halide, and that the silicon-containing copper catalyst can be regenerated repeatedly.

TABLE 3

Production of HSiCl₃ at various temperatures and pressures with catalyst comprising Cu, Au, and Mg on activated carbon.

| Cycle # | Flow Rates and Conditions Step 1 | Flow Rates and Conditions Step 2 | Time (min) Step 2 | Selectivity (mol % Si products) H2SiCl2 | Selectivity (mol % Si products) HSiCl3 | Selectivity (mol % Si products) SiCl4 |
|---|---|---|---|---|---|---|
| 1 | H₂: 100 sccm Temp: 750 °C. P: 82 kPag SiCl4: 19.3 sccm | HCl: 2 sccm H₂: 20 sccm P: 14 kPag | 22 42 | ND ND | 42.2 29.9 | 57.8 70.2 |
| 2 | H₂: 100 sccm Temp: 750 °C. P: 28 kPag SiCl4: 28.5 sccm | HCl: 5 sccm H₂: 10 sccm P: 14 kPag | 20 39 59 80 100 119 | ND ND ND ND ND ND | 15.8 16.7 19.0 22.3 24.5 23.4 | 84.3 83.3 81.0 77.8 75.5 76.6 |
| 3 | H₂: 100 sccm Temp: 750 °C. P: 165 kPag SiCl4: 30.3 sccm | HCl: 3 sccm H₂: 15 sccm P: 14 kPag | 20 40 60 | ND ND ND | 32.3 21.3 18.7 | 67.7 78.8 81.3 |
| 4 | H₂: 100 sccm Temp: 850 °C. P: 34 kPag SiCl4: 28.3 sccm | HCl: 5 sccm Ar: 10 sccm P: 14 kPag | 14 31 55 79 | ND ND ND ND | 24.3 15.4 ND ND | 75.7 84.6 100.0 100.0 |
| 5 | H₂: 100 sccm Temp: 850 °C. P: 28 kPag SiCl4: 29.9 sccm | HCl: 5 sccm H₂: 10 sccm P: 14 kPag | 14 31 51 | ND ND ND | 35.4 24.1 22.1 | 64.6 75.9 77.9 |
| 6 | H₂: 100 sccm Temp: 850 °C. P: 159 kPag SiCl4: 5.0 sccm | HCl: 5 sccm Ar: 10 sccm P: 14 kPag | 17 36 53 72 91 | ND ND ND ND ND | 22.9 15.1 13.0 ND ND | 77.1 84.9 87.0 100.0 100.0 |
| 7 | H₂: 100 sccm Temp: 850 °C. P: 28 kPag Time: 60 min SiCl4: 30.7 sccm | HCl: 2 sccm H₂: 20 sccm P: 345 kPag | 18 36 53 | 4.5 ND ND | 85.7 17.8 11.9 | 9.8 82.2 88.1 |
| 8 | H₂: 100 sccm Temp: 850 °C. P: 28 kPag Time: 60 min SiCl4: 29.6 sccm | HCl: 2 sccm Ar: 20 sccm P: 345 kPag | 18 35 53 71 | 2.4 ND ND ND | 84.9 23.6 8.1 7.2 | 12.7 76.4 91.9 92.9 |

Example 3

A catalyst comprising 15.2% (w/w) Pt and 1.4% (w/w) Cu on activated carbon was prepared contacted as in example 1 with the conditions listed in Table 4, and the products analyzed by GC-MS. No other silanes, other than those listed in Table 4, were detected in the effluent after the second step. This example shows that HSiCl₃ can be produced with good selectivity and that the silicon-containing copper catalyst can be regenerated.

TABLE 4

Production of HSiCl₃ at various temperatures and pressures with catalyst comprising Cu and Pt on activated carbon.

| Cycle # | Flow Rates and Conditions | | Time (min.) | Selectivity (mol % Si products) | |
|---|---|---|---|---|---|
| | Step 1 | Step 2 | | HSiCl3 | SiCl4 |
| 1 | H2: 100 sccm<br>Temp: 750° C.<br>P: 19 kPag<br>SiCl4: 7.7 sccm | HCl: 2.5 sccm<br>H2: 5 sccm<br>Temp: 300° C.<br>P: 75 kPag | 20<br>46<br>74<br>99 | ND<br>8.0<br>1.1<br>ND | 100<br>91.8<br>98.9<br>100 |
| 2 | H2: 100 sccm<br>Temp: 750° C.<br>P: 79 kPag<br>SiCl4: 4.4 sccm | HCl: 2.5 sccm<br>H2: 5 sccm<br>Temp: 450° C.<br>P: 63 kPag | 21<br>41<br>61 | 11.7<br>ND<br>ND | 88.3<br>100<br>100 |

Example 4

A catalyst comprising 16.3% (w/w) Cu, 0.7% (w/w) Au, and 0.2% (w/w) Mg on activated carbon was prepared and treated as described in example 1, except the stainless steel bubbler was at 22° C. to give a mole ratio of $H_2$ to $SiCl_4$ of 10:1 and the time was varied as indicated in Table 3, to form a silicon-containing copper catalyst comprising about 4% (w/w) Si. The silicon-containing copper catalyst was reacted in step 2 as in example 1 but with the parameters listed in Table 5 and at 300° C. in every cycle.

TABLE 5

Production of HSiCl₃ at various temperatures and pressures with catalyst comprising Cu, Au, and Mg on activated carbon (16.3% (w/w) Cu, 0.7% (w/w) Au, 0.2% (w/w) Mg on activated carbon).

| Cycle # | Flow Rates and Conditions | | Time (min.) | Selectivity (mol % Si products) | | |
|---|---|---|---|---|---|---|
| | Step 1 | Step 2 | | H2SiCl2 | HSiCl3 | SiCl4 |
| 1 | H₂: 100 sccm<br>SiCl4: 21.3 sccm<br>P: 63 kPag | HCl: 2 sccm<br>T: 300 ° C.<br>P: 10 kPag | 19<br>41<br>72 | ND<br>ND<br>ND | 65<br>52<br>36 | 35<br>48<br>64 |
| 2 | H₂: 100 sccm<br>SiCl4: 26.9 sccm<br>P: 26 kPag | HCl: 2 sccm<br>T: 300° C.<br>P: 276 kPag | 19<br>38<br>60 | 1<br>ND<br>ND | 80<br>22<br>14 | 19<br>78<br>86 |
| 3 | H₂: 100 sccm<br>SiCl4: 26.9 sccm<br>P: 28 kPag | HCl: 2 sccm<br>T: 300° C.<br>P: 349 kPag | 20<br>44<br>63 | 3<br>ND<br>ND | 80<br>20<br>16 | 17<br>80<br>84 |
| 4 | H₂: 100 sccm<br>SiCl4: 27.7 sccm<br>P: 29 kPag | HCl: 2 sccm<br>T: 300° C.<br>P: 352 kPag | 20<br>40<br>61 | ND<br>ND<br>ND | 65<br>22<br>20 | 35<br>78<br>80 |
| 5 | H₂: 100 sccm<br>SiCl4: 27.8 sccm<br>P: 23 kPag | HCl: 2 sccm<br>T: 300° C.<br>P: 345 kPag | 20<br>42<br>62 | 4<br>ND<br>ND | 83<br>24<br>21 | 13<br>76<br>79 |
| 6 | H₂: 100 sccm<br>SiCl4: 26.6 sccm<br>P: 28 kPag | HCl: 2 sccm<br>T: 300° C.<br>P: 346 kPag | 19<br>39<br>61 | 6<br>ND<br>ND | 88<br>28<br>22 | 5<br>72<br>78 |
| 7 | H₂: 100 sccm<br>SiCl4: 26.3 sccm<br>P: 26 kPag | HCl: 2 sccm<br>T: 300° C.<br>P: 358 kPag | 23<br>42<br>65 | 2<br>ND<br>ND | 85<br>24<br>20 | 13<br>76<br>80 |
| 8 | H₂: 100 sccm<br>SiCl4: 27.5 sccm<br>P: 24 kPag | HCl: 2 sccm<br>T: 300° C.<br>P: 301 kPag | 11<br>29<br>50 | ND<br>ND<br>ND | 94<br>64<br>22 | 6<br>36<br>78 |
| 9 | H₂: 100 sccm<br>SiCl4: 26.6 sccm<br>P: 26 kPag | HCl: 2 sccm<br>T: 300° C.<br>P: 531 kPag | 20<br>44 | ND<br>ND | 78<br>26 | 22<br>74 |

Example 5

A catalyst comprising 17.3% (w/w) Cu, 0.7% (w/w) Au, and 0.2% (w/w) Mg on activated carbon was prepared and treated as described in example 1, except the stainless steel bubbler was at 23° C. to give a mole ratio of $H_2$ to $SiCl_4$ of 10:1 and the time was varied as indicated in Table 6, to form a silicon-containing copper catalyst comprising about 4% (w/w) Si. The silicon-containing copper catalyst was reacted in step 2 as in example 1 but with the parameters listed in Table 6 and at 300° C. in every cycle.

TABLE 6

Production of HSiCl₃ at various temperatures and pressures with catalyst comprising Cu, Au, and Mg on activated carbon (17.3% Cu, 0.7% Au, and 0.2% Mg on C).

| Cycle # | Flow Rates and Conditions | | Time (min.) | Selectivity (mol % Si products) | | |
|---|---|---|---|---|---|---|
| | Step 1 | Step 2 | | H2SiCl2 | HSiCl3 | SiCl4 |
| 1 | H₂: 100 sccm<br>SiCl4: 27.6 sccm<br>P: 31 kPag | HCl: 2 sccm<br>T: 300° C.<br>P: 10 kPag | 10<br>28<br>47 | ND<br>ND<br>ND | 81<br>58<br>46 | 19<br>42<br>54 |
| 2 | H₂: 100 sccm<br>SiCl4: 28.4 sccm<br>P: 28 kPag | HCl: 2 sccm<br>T: 300° C.<br>P: 342 kPag | 9<br>23<br>40 | ND<br>5<br>ND | 78<br>78<br>17 | 22<br>16<br>83 |
| 3 | H₂: 100 sccm<br>SiCl4: 27.3 sccm<br>P: 32 kPag | HCl: 2 sccm<br>T: 300° C.<br>P: 355 kPag | 18<br>25<br>32<br>39 | 6<br>2<br>ND<br>ND | 86<br>76<br>39<br>20 | 8<br>22<br>61<br>80 |
| 4 | H₂: 100 sccm<br>SiCl4: 28.6 sccm<br>P: 28 kPag | HCl: 2 sccm<br>T: 300° C.<br>P: 354 kPag | 10<br>17<br>23<br>30 | 6<br>5<br>2<br>ND | 78<br>86<br>76<br>42 | 17<br>9<br>23<br>58 |
| 5 | H₂: 100 sccm<br>SiCl4: 28.3 sccm<br>P: 296 kPag | HCl: 2 sccm<br>T: 300° C.<br>P: 363 kPag | 10<br>17<br>23<br>30 | 8<br>5<br>3<br>ND | 81<br>83<br>75<br>41 | 12<br>12<br>22<br>59 |

That which is claimed is:

1. A method of preparing a trihalosilane, the method comprising the following separate and consecutive steps:
   (i) contacting a copper catalyst with hydrogen gas and a silicon tetrahalide at a temperature of from 500 to 1400° C. to form a silicon-containing copper catalyst comprising at least 0.1 by weight of silicon, wherein the copper catalyst comprises from 0.1 to 35% by weight of a mixture and the mixture comprises copper, gold and magnesium and the copper catalyst further comprises a support; and,
   (ii) contacting the silicon-containing copper catalyst with a hydrogen halide at from 100 to 600° C. to form a trihalosilane.

2. The method according to claim 1, further comprising (iii) contacting the silicon-containing copper catalyst contacted with the hydrogen halide in step (ii) with the hydrogen gas and the silicon tetrahalide at a temperature of from 500 to 1400° C. to reform the silicon-containing copper catalyst comprising at least 0.1% by weight of silicon; and (iv) contacting the reformed silicon-containing copper catalyst with the hydrogen halide at a temperature of from 100 to 600° C. to form a trihalosilane.

3. The method according to claim 2, further comprising repeating steps (iii) and (iv) at least 1 time.

4. The method according to claim 2, further comprising purging prior to the contacting of the reformed silicon-containing copper catalyst with the hydrogen halide in step (iv).

5. The method according to claim 4, wherein the purging is conducted with argon or silicon tetrachloride.

6. The method according to claim 1, further comprising purging prior to contacting the silicon-containing copper catalyst with the hydrogen halide in step (ii).

7. The method according to claim 6, wherein the purging is conducted with argon or silicon tetrachloride.

8. The method according to claim 1, wherein the support is activated carbon.

9. The method according to claim 1, wherein the silicon-containing copper catalyst comprises from 1 to 5% by weight of silicon.

10. The method according to claim 1, wherein mole ratio of hydrogen to silicon tetrahalide in step (i) is from 20:1 to 5:1.

11. The method according to claim 1, wherein step (ii) is conducted in the presence of hydrogen.

12. The method according to claim 1, wherein the trihalosilane has the formula $HSiX_3$, where X is fluoro, chloro, bromo, or iodo.

13. The method according to claim 1, wherein the hydrogen halide is HCl, the silicon tetrahalide is $SiCl_4$, and the trihalosilane is $HSiCl_3$.

14. The method according to claim 1, further comprising recovering the trihalosilane.

15. The method according to claim 1, wherein residence time of the hydrogen and silicon tetrahalide is from 1 to 10 s and residence time of the hydrogen halide is from 1 to 10 s.

16. The method according to claim 1, wherein the contacting in step (ii) is conducted at a pressure from 7 to 1000 kPag.

17. The method according to claim 1, wherein step (i) is conducted at a pressure from 7 to 1000 kPag.

18. The method of claim 1, further comprising: using the trihalosilane to produce polysilicon and/or polysiloxanes.

* * * * *